US008059554B2

(12) United States Patent
Lee et al.

(10) Patent No.: US 8,059,554 B2
(45) Date of Patent: Nov. 15, 2011

(54) SYSTEM AND METHOD FOR TRANSMITTING/RECEIVING INFORMATION ABOUT ALLOCATED UPLINK SOUNDING RESOURCES IN A COMMUNICATION SYSTEM

(75) Inventors: Sang-Min Lee, Suwon-si (KR); Young-Ho Jung, Suwon-si (KR); Tak-Ki Yu, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1021 days.

(21) Appl. No.: 11/998,261

(22) Filed: Nov. 28, 2007

(65) Prior Publication Data

US 2008/0123589 A1 May 29, 2008

(30) Foreign Application Priority Data

Nov. 28, 2006 (KR) .................. 10-2006-0118499

(51) Int. Cl.
*H04J 1/16* (2006.01)
(52) U.S. Cl. .............. 370/252; 370/329; 455/452.2
(58) Field of Classification Search .......... 370/252, 370/230, 235, 242, 248, 329, 330, 328, 310; 709/221, 224, 225, 226, 228, 229
See application file for complete search history.

(56) References Cited

U.S. PATENT DOCUMENTS

| 7,505,023 | B2 | 3/2009 | Jang et al. | |
| 7,773,535 | B2 | 8/2010 | Vook et al. | |
| 2006/0035643 | A1* | 2/2006 | Vook et al. | 455/450 |
| 2006/0094435 | A1* | 5/2006 | Thomas et al. | 455/450 |
| 2007/0263743 | A1* | 11/2007 | Lee et al. | 375/267 |

FOREIGN PATENT DOCUMENTS

| KR | 1020050063017 A | 6/2005 |
| KR | 1020050123041 A | 12/2005 |
| KR | 1020060004142 A | 1/2006 |
| KR | 1020060096018 A | 9/2006 |

* cited by examiner

*Primary Examiner* — Huy Vu
*Assistant Examiner* — Dady Chery (57) ABSTRACT

An system and method for transmitting/receiving sounding resource allocation information in a communication system are provided, in which a transmitter selects one of a plurality of preset sounding resource allocation patterns according to operation mode information about an receiver to which uplink resources will be allocated, the uplink resources having a period of a predetermined number of time units and a predetermined number of frequency units, reads resource layout information about each sounding subblocks of an active sounding resource allocation pattern corresponding to the selected sounding resource allocation pattern, and allocates at least one of the sounding subblocks of the sounding resource allocation pattern to the receiver according to the resource layout information and transmitting a sounding resource allocation information including the allocated sounding subblock information.

31 Claims, 8 Drawing Sheets

SYSTEM AND METHOD FOR TRANSMITTING/RECEIVING INFORMATION ABOUT ALLOCATED UPLINK SOUNDING RESOURCES IN A COMMUNICATION SYSTEM

CROSS-REFERENCE TO RELATED APPLICATION AND CLAIM OF PRIORITY

This application claims the benefit under 35 U.S.C. §119 (a) of a Korean Patent Application filed in the Korean Intellectual Property Office on Nov. 28, 2006 and assigned Serial No. 2006-118499, the entire disclosure of which is hereby incorporated by reference.

TECHNICAL FIELD OF THE INVENTION

The present invention relates to a system and method for transmitting and receiving information about allocated uplink sounding resources in a communication system.

BACKGROUND OF THE INVENTION

In general, future-generation communication systems are under development to provide high-speed large-volume data transmission and reception services to mobile stations. A major example of them is Institute of Electrical and Electronics Engineers (IEEE) 802.16e.

Figure 1:
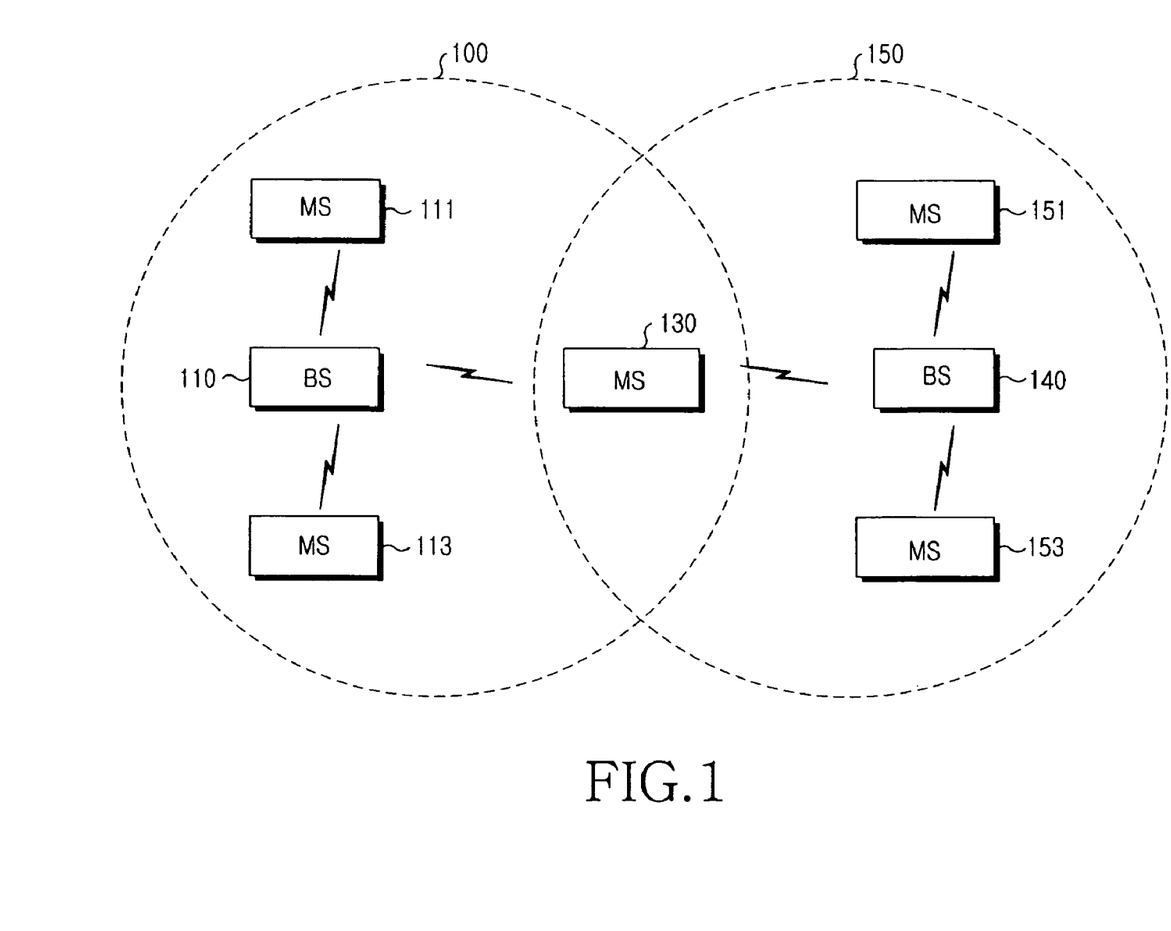
FIG. 1 illustrates the configuration of a typical IEEE 802.16e communication system.

With reference to FIG. 1, the configuration of an IEEE 802.16e communication system will be described.

FIG. 1 illustrates the configuration of a typical IEEE 802.16e communication system.

Referring to FIG. 1, the IEEE 802.16e communication system is multi-cellular. Thus, it includes cells 100 and 150, a base station (BS) 110 that covers the cell 100, a base station 140 that covers the cell 150, and a plurality of receivers 111, 113, 130, 151 and 153.

In an Orthogonal Frequency Division Multiple Access (OFDMA) communication system such as the IEEE 802.16e communication system, a base station requires uplink Channel Quality Information (CQI) of each receiver (MS) in order to allocate uplink resources. For this purpose, the base station can allocate dedicated uplink resources to receivers so that they transmit reference signals or pilot signals to the base station. The following description is made on the assumption that each mobile station transmits a pilot signal and the base station acquires the uplink CQI of the receiver by estimating the pilot signal received from the receiver.

If the IEEE 802.16e communication system operates in Time Division Duplex (TDD), it can be considered that an uplink CQI is equal to a downlink CQI. Even in Frequency Division Duplex (FDD), the downlink and uplink CQIs can be transmitted simultaneously by transmitting an analog downlink CQI value and a pilot signal at the same time. In the case where the IEEE 802.16e communication system does not use TDD, the base station acquires the uplink CQI of each receiver as follows.

In the IEEE 802.16e communication system, an uplink frame includes a sounding zone in which each receiver transmits a sounding signal on subcarriers. The sounding signal is a pilot signal by which the base station can acquire the uplink CQI of the receiver. For convenience sake, the terms "sounding signal" and "pilot signal" are interchangeably used in the same meaning.

Only upon request of the base station, the receiver transmits the sounding signal using allocated subcarriers and time resources in the sounding zone. The sounding zone has uplink resources common to all receivers within the base station. Under the control of the base station, the receivers share the subcarriers of the sounding zone.

As described above, to estimate the uplink CQIs of the receivers, the base station should transmit to the receivers uplink resource allocation information indicating frequency resources and time resources in which they will transmit their sounding signals. The uplink resource allocation information includes the following:

(1) The number of allocated sound pilots;
(2) The time-frequency positions of the sounding pilots; and
(3) A sounding pilot allocation period.

To acquire the uplink CQIs of the receivers, the base station should transmit the above complex information to the receivers, for uplink resource allocation to them. Accordingly, reduction of the uplink resource allocation information associated with the uplink CQI acquisition is very significant in terms of overall system overhead.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide a system and method for transmitting and receiving information about allocated uplink sounding resources in a communication system.

In accordance with an aspect of exemplary embodiments of the present invention, there is provided a method of a base station for transmitting sounding resources allocation information in a communication system, in which the base station selects one of a plurality of preset sounding resource allocation patterns according to operation mode information about a receiver to which uplink resources will be allocated, the uplink resources having a period of a predetermined number of time units and a predetermined number of frequency units, reads resource layout information about each sounding subblocks of an active sounding resource allocation pattern corresponding to the selected sounding resource allocation pattern, and allocates at least one of the sounding subblocks of the sounding resource allocation pattern to the receiver according to the resource layout information by a sounding resource allocation message and transmits a sounding resource allocation information including the allocated sounding subblock information.

In accordance with another aspect of exemplary embodiments of the present invention, there is provided a method for receiver receiving sounding resource allocation information in a receiver in a communication system, in which the receiver receives sounding resource allocation information from a base station, reads resource layout information about sounding subblocks of an active sounding resource allocation pattern corresponding to a sounding resource allocation pattern index included in the sounding resource allocation information, if the received sounding resource allocation pattern index is different from a previous sounding resource allocation pattern index, and maps one of channel quality information value and a sounding signal to sounding resources allocated by the resource layout information and the sounding resource allocation information. In accordance with a further aspect of exemplary embodiments of the present invention, there is provided an system for transmitting/receiving sounding resource allocation information in a communication system, in which at least one of an receivers and a base station wherein the base station includes a sounding resource allocation pattern decider selects one of a plurality of preset sounding resource allocation patterns according to operation mode information about a receiver to which uplink resources will be allocated, a frame structure, and a resource ratio, a sounding resource allocation pattern memory stores resource layout information about sounding subblocks of each sounding resource allocation pattern, and a controller reads resource layout information about each sounding subblocks of an active sounding resource allocation pattern corresponding to the selected sounding resource allocation pattern from the sounding subblock pattern memory, and allocates at least one of the sounding subblocks of the sounding resource allocation pattern to the receiver according to the resource layout information.

In accordance with still another aspect of exemplary embodiments of the present invention, there is provided an system for transmitting/receiving receiver sounding resource allocation information in a communication system, in which a base station, and an receiver communicating with the base station wherein the receiver includes a controller receives sounding resource allocation information from a base station, reads resource layout information about sounding subblocks of an active sounding resource allocation pattern corresponding to a sounding resource allocation pattern index included in the sounding resource allocation information from a sounding resource allocation pattern memory, if the received sounding resource allocation pattern index is different from a previous sounding resource allocation pattern index, the sounding resource allocation pattern memory stores resource layout information about sounding resource allocation patterns for respective sounding resource allocation pattern indexes, and a sounding signal generator maps a CQI value or a sounding signal to sounding resources allocated by the resource layout information and the sounding resource allocation information and transmits the mapped CQI value or sounding signal to the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 2 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

Exemplary embodiments of the present invention provide an system and method for transmitting and receiving information about allocated uplink sounding resources in a communication system. The exemplary embodiments of the present invention also provide an system and method for transmitting and receiving resource allocation information about allocated uplink resources in which an receiver (MS) will transmit its uplink CQI or a reference signal in a communication system. For convenience sake, the present invention will be described in the context of an IEEE 802.16e communication system, while it is also applicable to other communication systems.

To acquire uplink CQIs of receivers that a base station (BS) serves, the BS allocates dedicated uplink resources, for example, sounding channels to the receivers on which the receivers can transmit the uplink CQIs in the IEEE 802.16e communication system. The sounding channels are uplink resources in which the receivers transmit reference signals, for example, pilot signals, so as to enable the base station to acquire the uplink CQIs of the receivers. The following description is made on the assumption that each receiver transmits a pilot signal and the base station acquires the uplink CQI of the receiver by estimating the pilot signal.

An IEEE 802.16e uplink frame includes a sounding zone. Each receiver transmits a sounding signal using allocated time-frequency resources in the sounding zone. The sounding signal is a pilot signal from which the base station acquires the uplink CQI. The terms "sounding signal" and "pilot signal" are interchangeably used in the same meaning. Only upon request of the base station, the receiver transmits the sounding signal using the allocated resources in the sounding zone. The sounding zone has uplink resources common to all receivers within the base station. Under the control of the base station, the receivers share the time-frequency resources of the sounding zone.

To allocate the sounding channel in the current IEEE 802.16e communication system, the base station has to transmit information indicating time-frequency resources in which the receiver is to transmit the sounding signal. That is, to estimate the uplink CQIs of the receivers, the base station should transmit to the receivers uplink resource allocation information indicating frequency resources and time resources in which they will transmit their sounding signals. However, the uplink resource allocation information adds overhead, thus decreasing overall system transmission efficiency. In this context, to minimize the uplink resource allocation information, the present invention provides an system and method for preliminarily patterning a given sounding zone group area according to sounding resource allocation patterns required for operation modes of receivers and transmitting the indexes of subblocks allocated to the receivers within the sounding resource allocation patterns as uplink resource allocation information to the receivers. The sounding zone group area is grouping sounding zone of predetermined frames.

The operation mode of a receiver is determined according to the capabilities of the base station and the receiver, the channel characteristics of the receiver, a multiple-input, multiple-output (MIMO) transmission scheme used in the receiver, a localized or distributed transmission scheme used in the receiver, the transmit power of the receiver, and a base station deployment environment, for example.

Thus, operation mode information includes information about the capabilities of the base station and the receiver, the channel characteristics of the receiver, the MIMO transmission scheme of the receiver, the localized/distributed transmission scheme of the receiver, the transmit power of the receiver, and the base station deployment environment. The base station receives the operation mode information from the receiver.

To support a variety of operation mode combinations for each receivers, a plurality of sounding resource allocation pattern blocks are preliminarily designed and stored in memories of the base station and the receiver. The sounding zone group area is defined by a predetermined number of time units and a predetermined number of frequency units. It is assumed herein that a time unit is a frame and a frequency unit is a subcarrier or a subchannel. The subchannel includes at least one subcarrier.

Figure 2:
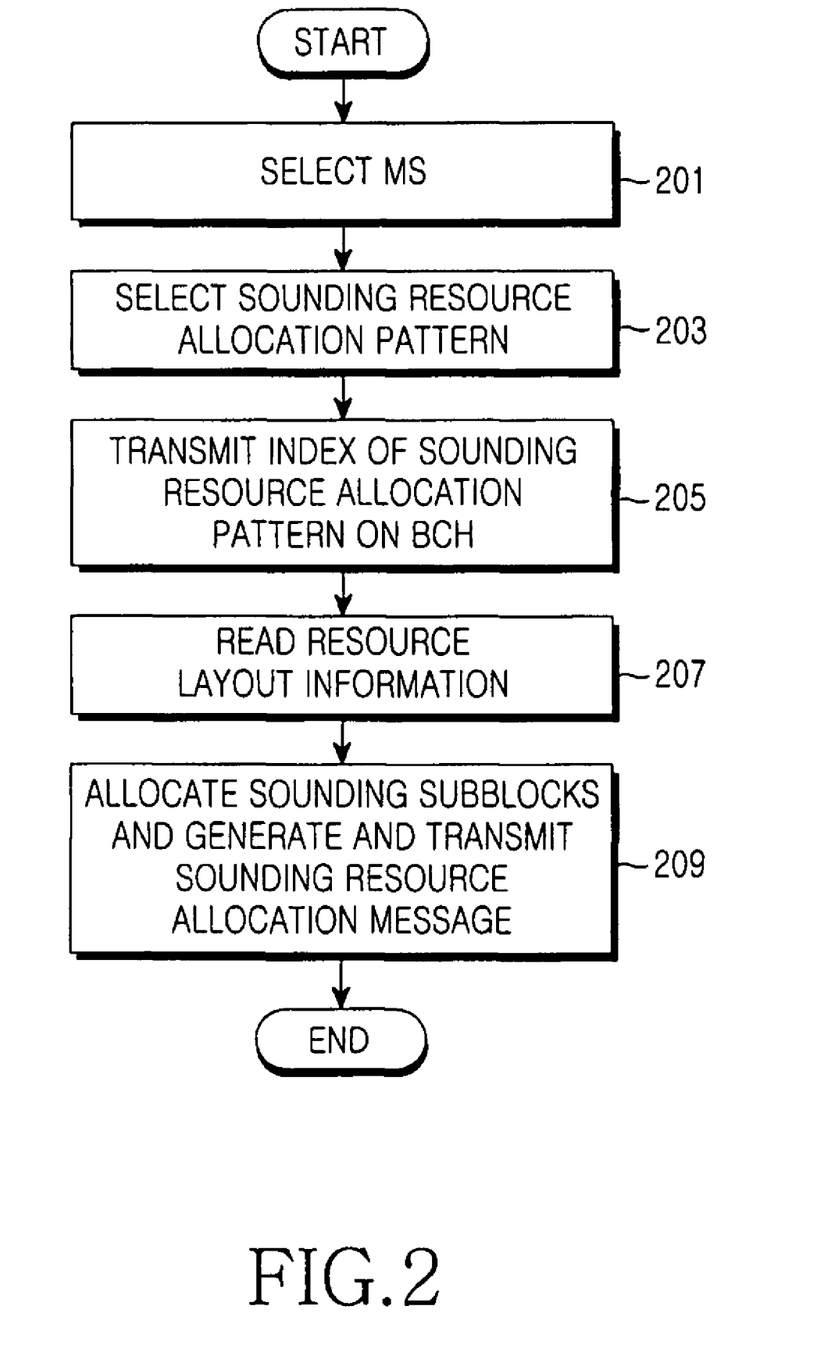
FIG. 2 is a flowchart of a sounding resource allocation operation in a base station in a communication system according to an exemplary embodiment of the present invention.

FIG. 2 is a flowchart of a sounding resource allocation operation in a base station in a communication system according to an exemplary embodiment of the present invention.

Referring to FIG. 2, the base station selects an receiver to which it will allocate sounding resources by scheduling in step 201.

In step 203, the base station selects one sounding resource allocation pattern of a plurality of preset sounding resource allocation patterns based on information about the receiver, a frame structure, and a resource ratio. In step 205, the base station transmits the index of the selected sounding resource allocation pattern to the receiver on a downlink Broadcasting CHannel (BCH), periodically or upon occurrence of an event triggering a change of the sounding resource allocation pattern.

The base station considers operation mode information about the receiver in selecting the sounding resource allocation pattern in the following manner:

(1) The base station considers at least one of base station capability information and receiver capability information. According to the capability information, the operation mode of the receiver can be limited to a particular MIMO transmission scheme. The base station selects a sounding allocating pattern satisfying feedback amount and period requirements for the MIMO transmission scheme.

(2) The base station considers information about the channel characteristics of the receiver. Since the channel of a slow receiver changes slowly, the base station can select an operation mode for the mobile station, in which the receiver feeds back channel information in a long time period. If a plurality of such receivers exist within the cell of the base station, the base station selects an active sounding allocation pattern having a long time period (i.e. a less frequent active sounding allocation pattern).

If the channel of the receiver experiences severe multipath fading, i.e. the receiver moves fast, the base station can determine an operation mode for the receiver, in which the receiver feeds back channel information with a short period along the frequency axis. If a plurality of such receivers exists within the cell of the base station, the base station selects an active sounding allocation pattern having a short time period (a highly frequent active sounding allocation pattern).

(3) The base station considers at least one of MIMO scheme information, localized transmission scheme information, and distributed transmission scheme information. Feedback information differs in period and amount for the transmission schemes.

For example, if the base station uses an antenna selection scheme among MIMO schemes, this antenna selection scheme has a smaller feedback amount and a different feedback period, compared to beamforming. If the base station uses the localized transmission scheme, the receiver should feed back channel information about a specific frequency band. If the base station uses the distributed transmission scheme, the receiver should feed back channel information about the entire frequency band.

The base station selects an active sounding allocation pattern satisfying feedback amount and period requirements for each transmission scheme.

(4) The base station considers the transmit power information of the receiver. For the same amount of feedback information, required transmission resources vary with the transmit power of the receiver. For an receiver with high transmit power, the base station uses a Modulation and Coding Scheme (MCS) offering high frequency efficiency so that the receiver can transmit the feedback information with less transmission resources. For an receiver with low transmit power, the base station uses an MCS offering low frequency efficiency so that the receiver can transmit the feedback information with more transmission resources.

As the amount of transmission resources varies with the transmit power of the receiver, the base station selects a sounding resource allocation pattern that suits a required transmission resource amount.

(5) The base station considers a base station deployment environment. Indoors, most of receivers move slowly. In this case, many receivers are in the operation mode where they feed back channel information in a long time period. Thus, the base station selects an active sounding resource allocation pattern with a long time period (i.e., a less frequent active sounding allocation pattern).

Outdoors, channels are propagated in multiple paths. Thus, many receivers are in the operation mode in which they feed back channel information in a short period along the frequency axis. Thus, the base station selects an active sounding allocation pattern with a short time period (i.e., a highly frequent active sounding allocation pattern).

In step 207, the base station reads resource layout information about the sounding subblocks of an active sounding resource allocation pattern corresponding to the selected sounding resource allocation pattern index from its sounding resource allocation pattern memory. Then, the base station allocates sounding subblocks within the active sounding resource allocation pattern to the receiver according to the resource layout information, generates a sounding resource allocation message with a one-dimensional index mapped to the sounding subblocks based on sounding resource allocation pattern about the receiver, and transmits the sounding resource allocation message to the receiver in step 209.

The sounding resource allocation message includes the following information:

(1) An receiver IDentifier (ID);

(2) The index of a sounding resource allocation pattern block: One base station uses one sounding resource allocation pattern at a given time;

(3) A sounding subblock index (The sounding subblock index is index of sounding subblock included in the sounding resource allocation pattern); and (4) A sounding subblock allocation period: The sounding subblock allocation duration is the time period for which the receiver can use the allocated sounding resources.

The sounding resource allocation message is transmitted in one of the following transmission types:

(1) Type 1—The sounding resource allocation message is transmitted on the BCH every predetermined time period;

(2) Type 2—The sounding resource allocation message is transmitted in a predetermined dedicated message such as a MAP message;

(3) Type 3—The sounding resource allocation message is transmitted together with information about a data channel allocated to the receiver. In this case, the uplink resource allocation information can be reconfigured not to include the receiver ID, thereby decreasing overhead; and (4) Type 4—The sounding resource allocation message is transmitted together with data on a data channel. That is, an indicator indicating whether the sounding resource allocation message will be transmitted on the data channel is included in the data channel. If the sounding resource allocation message is included in the data channel, the indicator is set to, for example, '1' so that the receiver can be aware of the presence of the sounding resource allocation message. The sounding resource allocation message is piggybacked with the indicator.

While not described separately, it can be further contemplated that the receiver receives the sounding resource allocation message from the base station and transmits an uplink CQI or a sounding signal in accordance with the sounding resource allocation message.

The base station includes a sounding resource allocation pattern decider, the sounding resource allocation pattern memory, a controller, a scheduler, a broadcast message transmitter, and a sounding resource allocation message generator.

The sounding resource allocation pattern decider selects one sounding resource allocation pattern of a plurality of preset sounding resource allocation patterns according to information about the operation mode and velocity of the receiver to which sounding resources will be allocated, a frame structure, and a resource ratio.

The sounding subblock pattern memory stores resource layout information about the sounding subblocks of each sounding resource allocation pattern.

The controller reads the resource layout information of the sounding subblocks of an active sounding resource allocation pattern corresponding to the selected sounding resource allocation pattern and allocates one or more sounding subblocks to the receiver based on the resource layout information.

The scheduler selects the receiver to which the sounding resources will be allocated by scheduling.

The controller outputs the information about the selected receiver, the frame structure, and the resource ratio to the sounding resource allocation pattern decider and, upon receipt of the index of the selected sounding resource allocation pattern from the sounding resource allocation pattern decider, outputs the received index to the broadcast message transmitter. The controller also provides sounding resource allocation information about the receiver to the sounding resource allocation message generator.

The broadcast message transmitter transmits the sounding resource allocation pattern index to the receiver on the BCH.

The sounding resource allocation message generator generates a sounding resource allocation message using the sounding resource allocation information and transmits it to the receiver.

The controller generates an element pattern group for each operation mode according to the operation mode information, generates at least one element pattern matrix for each element pattern group, generates a sounding resource allocating pattern by combining a plurality of element pattern matrices, and stores the generated sounding resource allocation pattern in the sounding subblock pattern memory.

The controller forms all element matrices satisfying requirements for time and frequency periods and positions of sounding resources for the operation mode, and indexes each of the element matrices.

The controller generates a plurality of sounding resource allocation patterns according to each operation mode ratio of the receivers.

The controller indexes the plurality of sounding resource allocation patterns.

The controller divides each of the sounding resource allocation patterns into sounding subblocks corresponding to the element pattern matrices and allocates one-dimensional indexes to the sounding subblocks.

The controller generates the sounding resource allocation message including the sounding resource allocation information and transmits to the receiver the sounding resource allocation message together with a data channel resource allocation message. the sounding resource allocation message generator generates the sounding resource allocation message including the sounding resource allocation information and piggybacking data with the sounding resource allocation message and transmitting t the receiver the data piggybacked with the sounding resource allocation message.

The broadcast message transmitter transmits the index of the selected sounding resource allocation pattern on a broadcasting channel, periodically or when the index of the selected sounding resource allocation pattern needs to be changed.

The sounding resource allocation message generator generates the sounding resource allocation message including the sounding resource allocation information and transmits the sounding resource allocation message to the receiver.

Figure 3:
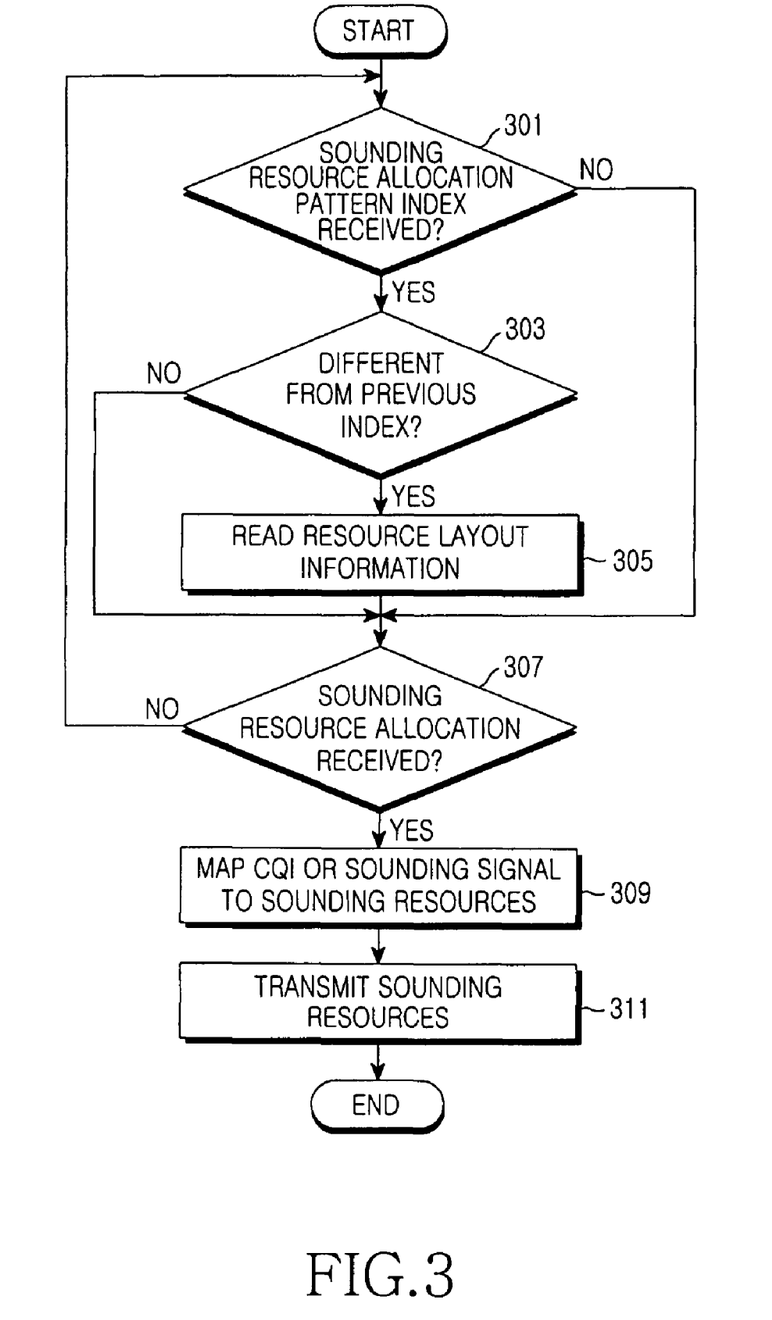
FIG. 3 is a flowchart of an operation for transmitting a CQI using sounding resources in an MS in the communication system according to an exemplary embodiment of the present invention.

FIG. 3 is a flowchart of an operation for transmitting a CQI using sounding resources in an receiver in the communication system according to an exemplary embodiment of the present invention.

Referring to FIG. 3, the receiver monitors reception of a sounding resource allocation pattern index on the downlink BCH in step 301. Upon receipt of the sounding resource allocation pattern index, the receiver compares the received sounding resource allocation pattern index with a previous sounding resource allocation pattern index in step 303. If the indexes are different, the receiver reads resource layout information about an active sounding resource allocation pattern corresponding to the received index from its sounding resource allocation pattern memory in step 305 and monitors reception of a sounding resource allocation message from the base station in step 307.

On the other hand, if the receiver has not received the sounding resource allocation pattern index in step 301 or if the two pattern indexes are identical in step 303, the receiver monitors reception of a sounding resource allocation message from the base station in step 307.

Upon receipt of the sounding resource allocation message from the base station, the receiver maps a CQI and a pilot signal to sounding resource allocation pattern indicated by sounding resource allocation information included in the sounding resource allocation message and the resource layout information of the active sounding resource allocation pattern in step 309 and transmits the sounding resource message to the base station in step 311. If the receiver has not received the sounding resource allocation message in step 307, the receiver returns to step 301.

The receiver includes a controller, a sounding resource allocation pattern memory, and a sounding signal generator.

The controller receives sounding resource allocation information from the base station. If a sounding resource allocation pattern index included in the sounding resource allocation information is different from a previous one, the controller reads resource layout information about an active sounding resource allocation pattern corresponding to the received sounding resource allocation pattern index from the sounding resource allocation pattern memory.

The sounding resource allocation pattern memory stores resource layout information about sounding resource allocation patterns.

The sounding signal generator maps a CQI or a sounding signal to sounding resources allocated by the resource layout information and the sounding resource allocation information and transmits it to the base station.

The sounding resource allocation pattern index is received on a broadcasting channel and the other sounding resource allocation information is received by a sounding resource allocation message.

Now a description will be made of uplink sounding resource allocation patterns with reference to FIGS. 4 and 5.

Figure 4:
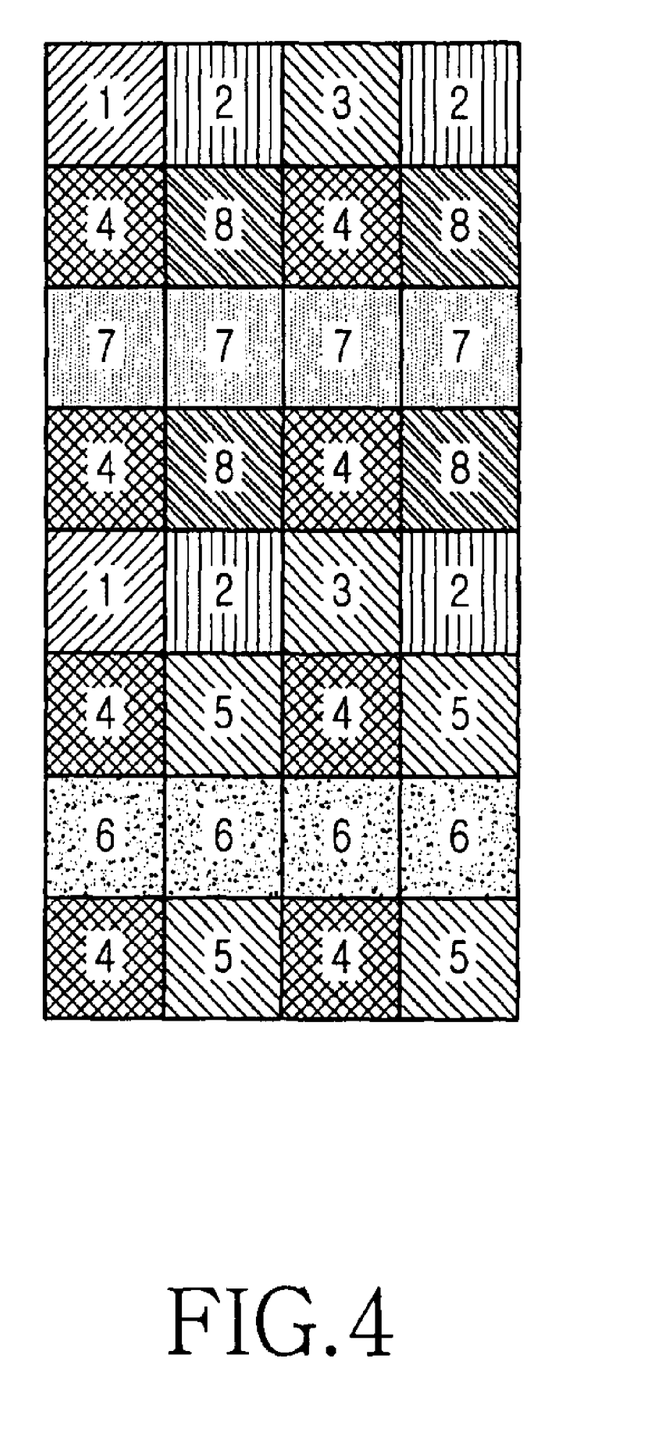
FIG. 4 illustrates a design of a first sounding resource allocation pattern in the communication system according to an exemplary embodiment of the present invention.

FIG. 4 illustrates a design of a first sounding resource allocation pattern in the communication system according to an exemplary embodiment of the present invention. The sounding zone group area illustrated in FIG. 4 is defined by four time units and eight frequency units. The first sounding resource allocation pattern includes a plurality of sounding subblocks.

Referring to FIG. 4, each numeral denotes the index of an sounding subblock in the sounding resource allocation pattern. The first sounding resource allocation pattern combination includes first to eight sounding subblocks. The sounding subblocks will be described in more detail.

As described before, for the base station to acquire the uplink CQI of each receiver, the receiver should transmit a sounding signal to the base station. In general, the base station acquires the CQI according to characteristics of the receiver such as its operation mode. Therefore, the base station allocates uplink sounding resources to the receiver according to the characteristics of the receiver.

Hence, an sounding resource allocation pattern is determined according to the operation mode characteristics of the receiver. The uplink resource allocation pattern is defined by time units and frequency units. The first to eighth sounding subblocks will be described individually.

Sounding subblocks 1 carry a sounding signal with a transmission period of four time units and four frequency units in the sounding zone group area.

Sounding subblocks 2 carry a sounding signal with a transmission period of two time units and four frequency units in the sounding zone group area.

Sounding subblocks 3 carry a sounding signal with a transmission period of four time units and four frequency units in the sounding zone group area.

Sounding subblocks 4 carry a sounding signal with a transmission period of two time units and two frequency units in the sounding zone group area.

Sounding subblocks 5 are different from sounding subblocks 1 to 4 in that when the sounding zone group area is divided into two halves in the frequency domain, first and second sub-sounding zone group areas, sounding subblocks 5 carry a sounding signal only in the second sub-sounding zone group area.

Therefore, sounding subblocks 5 carry a sounding signal with a transmission period of two time units and two frequency units in the second sub-sounding zone group area.

Sounding subblocks 6 carry a sounding signal with a transmission period of one time unit and eight frequency units in the sounding zone group area.

Sounding subblocks 7 carry a sounding signal with a transmission period of one time unit and one frequency unit in the sounding zone group area.

Sounding subblocks 8 are similar to sounding sub-blocks 5 in that sounding subblocks 8 carry a sounding signal with a transmission period of two time units and two frequency units in the first sub-sounding zone group area.

Figure 5:
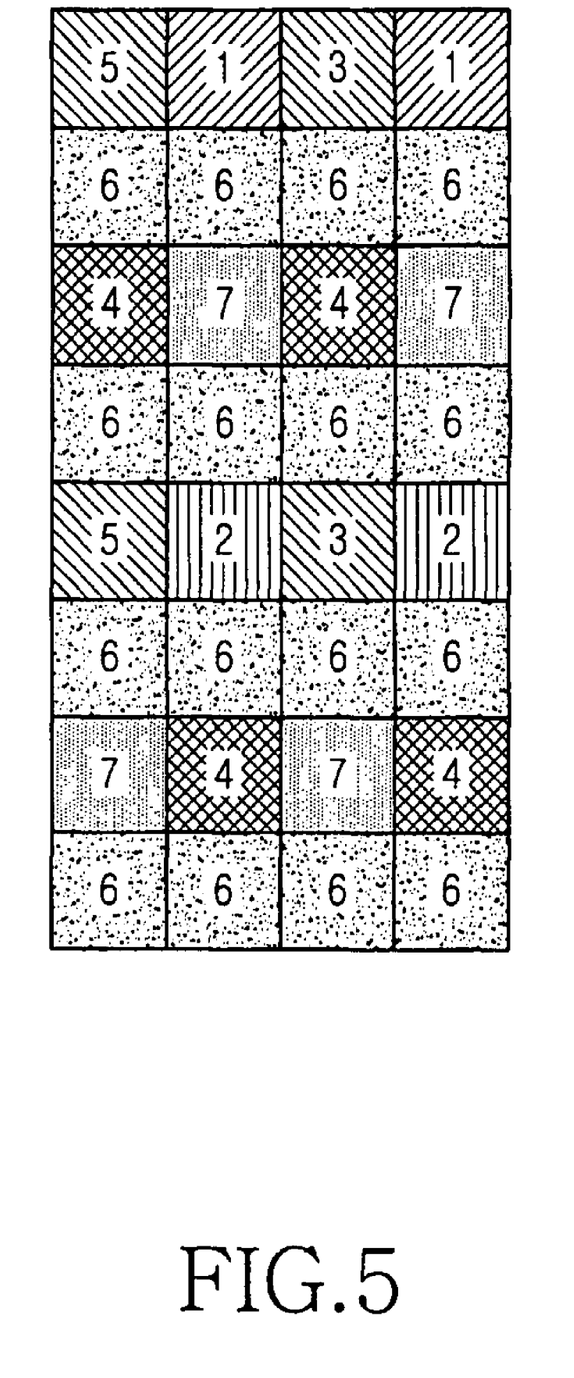
FIG. 5 illustrates a design of a second uplink sounding resource allocation pattern in the communication system according to an exemplary embodiment of the present invention.

FIG. 5 illustrates a sounding zone group area to which a second sounding resource allocation pattern is applied in the communication system according to an exemplary embodiment of the present invention.

Referring to FIG. 5, the sounding zone group area is defined by four time units and eight frequency units. The second uplink sounding resource allocation pattern includes a plurality of sounding subblocks.

Each numeral illustrated in FIG. 5 denotes the index of a sounding subblock. The second sounding resource allocation pattern has a different sounding subblock combination from that of the first sounding resource allocation pattern. The second sounding resource allocation pattern includes first to seventh sounding subblocks. The sounding subblocks will be described in more detail.

Sounding subblocks 1 carry a sounding signal with a transmission period of two time units and eight frequency units in the sounding zone group area.

Sounding subblocks 2 carry a sounding signal with a transmission period of two time units and eight frequency units in the sounding zone group area.

Sounding subblocks 3 carry a sounding signal with a transmission period of four time units and four frequency units in the sounding zone group area.

Sounding subblocks 4 are different from sounding subblocks 1, 2 and 3 in that when the sounding zone group area is divided into two halves in the time domain, first and second sub-sounding zone group areas, sounding subblocks 4 carry a sounding signal in the two sub-sounding zone group areas.

Therefore, sounding subblocks 4 carry a sounding signal with a transmission period of one time unit and four frequency units in the two sub-sounding zone group areas. The sounding signal is transmitted at the same uplink resource positions in the first and second sub-sounding zone group areas.

Sounding subblocks 5 carry a sounding signal with a transmission period of four time units and four frequency units in the sounding zone group area.

Sounding subblocks 6 carry a sounding signal with a transmission period of one time unit and two frequency units in the sounding zone group area.

Sounding subblocks 7 are similar to sounding sub-blocks 4 in that sounding subblocks 7 carry a sounding signal with a transmission period of one time unit and four frequency units in the two sub-sounding zone group areas. The sounding signal is transmitted at the same resource positions in the first and second sub-sounding zone group areas.

In the sounding resource allocation information transmitting method according to the exemplary embodiment of the present invention, a plurality of sounding resource allocation pattern blocks as illustrated in FIGS. 4 and 5 are preset according to ratios of operation modes of receivers to be supported. The base station selects one of the sounding resource allocation pattern according to an receiver ratio and notifies the MS of the selected sounding resource allocation pattern. Then the base station transmits sounding resource allocation information including the index of allocated subblocks in the sounding resource allocation pattern to the receiver.

The base station and all receivers are aware of the sounding resource allocation patterns and the base station transmits only the index of allocated subblocks to the receiver. Therefore, the transmission of relatively simple uplink resource allocation information facilitates the receiver to transmit a sounding signal.

Figure 6:
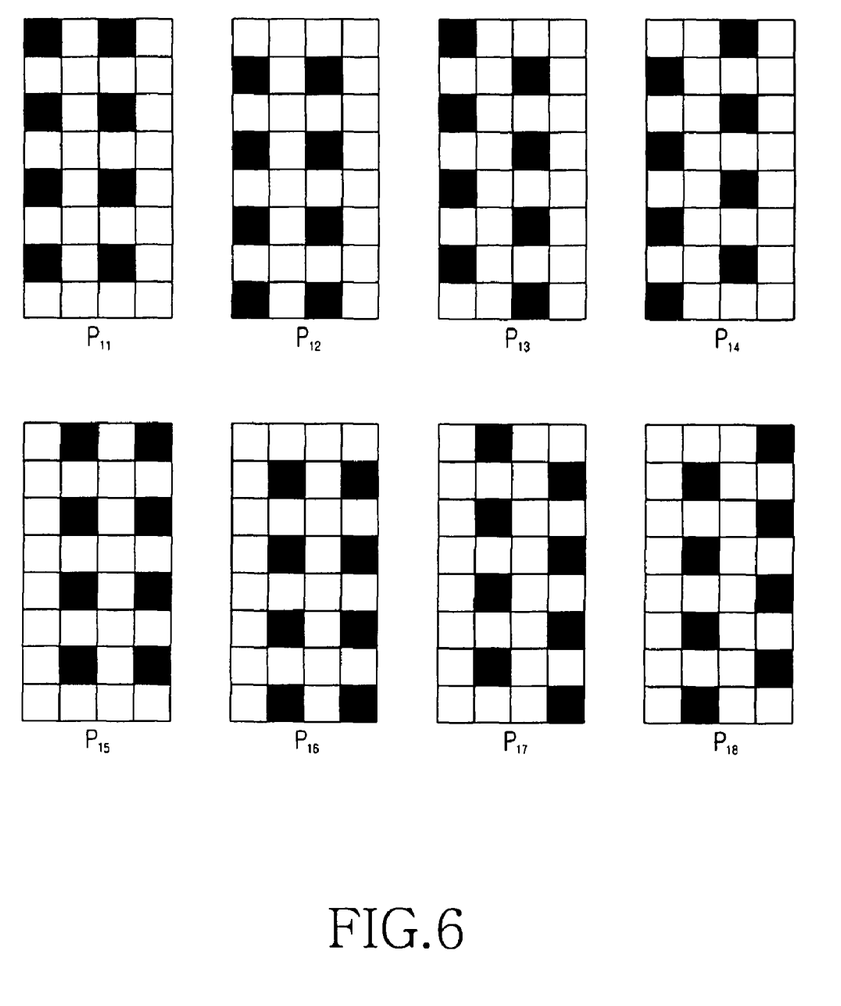
FIG. 6 illustrates a set of sounding resource base matrices according to an exemplary embodiment of the present invention.
Figure 7:
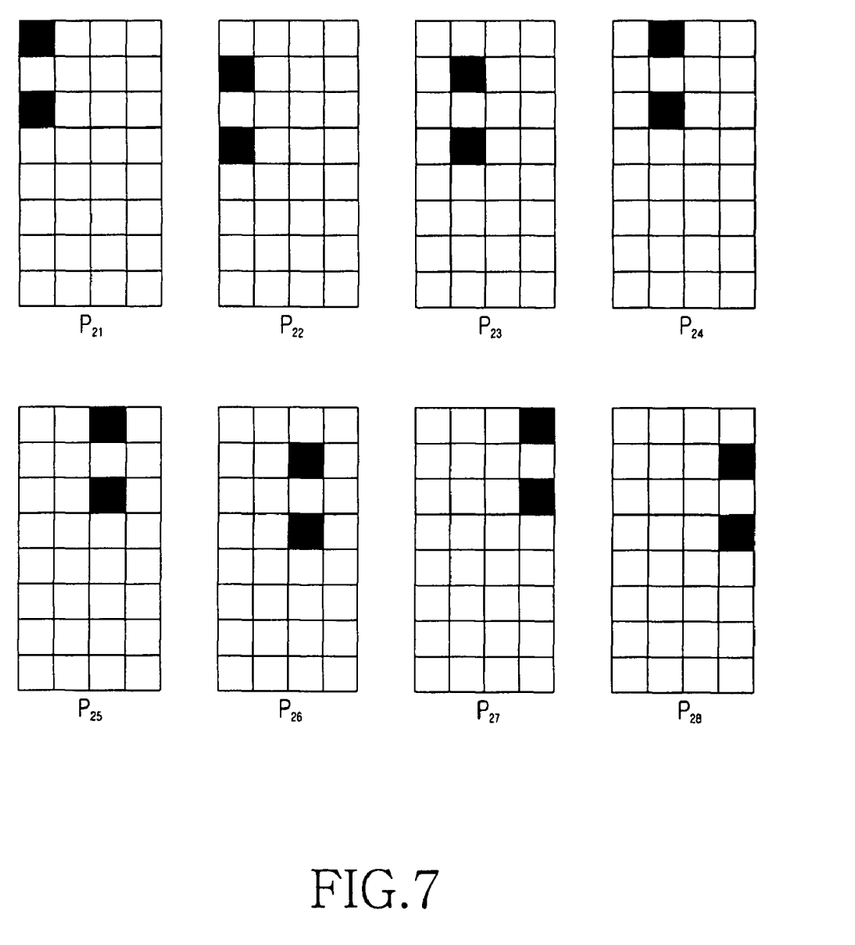
FIG. 7 illustrates a set of sounding resource base matrices according to another exemplary embodiment of the present invention.

With reference to FIGS. 6 and 7, a method for designing a sounding resource allocation pattern according to a desired ratio of supported operation modes will be described.

To generate a sounding resource allocation pattern, a sounding pattern matrix set is formed according to the sounding resource allocation features of different operation modes. The sounding pattern matrix set is comprised of a plurality of element pattern groups satisfying different sounding resource allocation requirements and each element pattern group includes a plurality of element pattern matrices.

FIG. 6 illustrates a set of sounding resource base matrices according to an exemplary embodiment of the present invention.

Referring to FIG. 6, element patterns are designed such That a sounding signal has a transmission period of two time units and two frequency units. A plurality of such element patterns exist. These element patterns form an element pattern group.

In this case, the element patterns can be represented as the following element pattern matrices.

$P_{11}$=[1 0 1 0; 0 0 0 0; 1 0 1 0; 0 0 0 0; 1 0 1 0; 0 0 0 0; 1 0 1 0; 0 0 0 0]

$P_{12}$=[0 0 0 0; 1 0 1 0; 0 0 0 0; 1 0 1 0; 0 0 0 0; 1 0 1 0; 0 0 0 0; 1 0 1 0]

$P_{13}$=[1 0 0 0; 0 1 0 0; 1 0 0 0; 0 1 0 0; 1 0 0 0; 0 1 0 0; 1 0 0 0; 0 1 0 0]

$P_{14}$=[0 0 1 0; 1 0 0 0; 0 0 1 0; 1 0 0 0; 0 0 1 0; 1 0 0 0; 0 0 1 0; 1 0 0 0]

$P_{15}$=[0 1 0 1; 0 0 0 0; 0 1 0 1; 0 0 0 0; 0 1 0 1; 0 0 0 0; 0 1 0 1; 0 0 0 0]

$P_{16}$=[0 0 0 0; 0 1 0 1; 0 0 0 0; 0 1 0 1; 0 0 0 0; 0 1 0 1; 0 0 0 0; 0 1 0 1]

$P_{17}$=[0 1 0 0; 0 0 0 1; 0 1 0 0; 0 0 0 1; 0 1 0 0; 0 0 0 1; 0 1 0 0; 0 0 0 1]

$P_{18}$=[0 0 0 1; 0 1 0 0; 0 0 0 1; 0 1 0 0; 0 0 0 1; 0 1 0 0; 0 0 0 1; 0 1 0 0]

Hence, the element pattern group includes the element pattern matrices, i.e., $P_{11}$ to $P_{18}$.

FIG. 7 illustrates a set of sounding resource base matrices according to another exemplary embodiment of the present invention.

Referring to FIG. 7, element patterns are designed such that a sounding signal is transmitted with a period of four time units and two frequency units in a first sub-sounding zone group area. Notably, the sounding zone group area is divided into first and second sub-sounding zone group areas in the frequency domain. A plurality of such element patterns exist. Thus, the element patterns form an element pattern group.

In this case, the element patterns are represented as the following element pattern matrices.

$P_{21}$=[1 0 0 0; 0 0 0 0; 1 0 0 0; 0 0 0 0; 0 0 0 0; 0 0 0 0; 0 0 0 0; 0 0 0 0]

$P_{22}$=[1 0 0 0; 1 0 0 0; 0 0 0 0; 1 0 0 0; 0 0 0 0; 0 0 0 0; 0 0 0 0; 0 0 0 0]

$P_{23}$=[0 1 0 0; 0 0 0 0; 0 1 0 0; 0 0 0 0; 0 0 0 0; 0 0 0 0; 0 0 0 0; 0 0 0 0]

$P_{24}$=[0 0 0 0; 0 1 0 0; 0 0 0 0; 0 1 0 0; 0 0 0 0; 0 0 0 0; 0 0 0 0; 0 0 0 0]

$P_{25}$=[0 0 1 0; 0 0 0 0; 0 0 1 0; 0 0 0 0; 0 0 0 0; 0 0 0 0; 0 0 0 0; 0 0 0 0]

$P_{26}$=[0 0 0 0; 0 0 1 0; 0 0 0 0; 0 0 1 0; 0 0 0 0; 0 0 0 0; 0 0 0 0; 0 0 0 0]

$P_{27}$=[0 0 0 1; 0 0 0 0; 0 0 0 1; 0 0 0 0; 0 0 0 0; 0 0 0 0; 0 0 0 0; 0 0 0 0]

$P_{28}$=[0 0 0 0; 0 0 0 1; 0 0 0 0; 0 0 0 1; 0 0 0 0; 0 0 0 0; 0 0 0 0; 0 0 0 0]

Therefore, the element pattern group includes the element pattern matrices, $P_{21}$ to $P_{28}$. A element pattern matrix $P_{ij}$ denotes a element pattern group i and element pattern matrix j.

Figure 8:
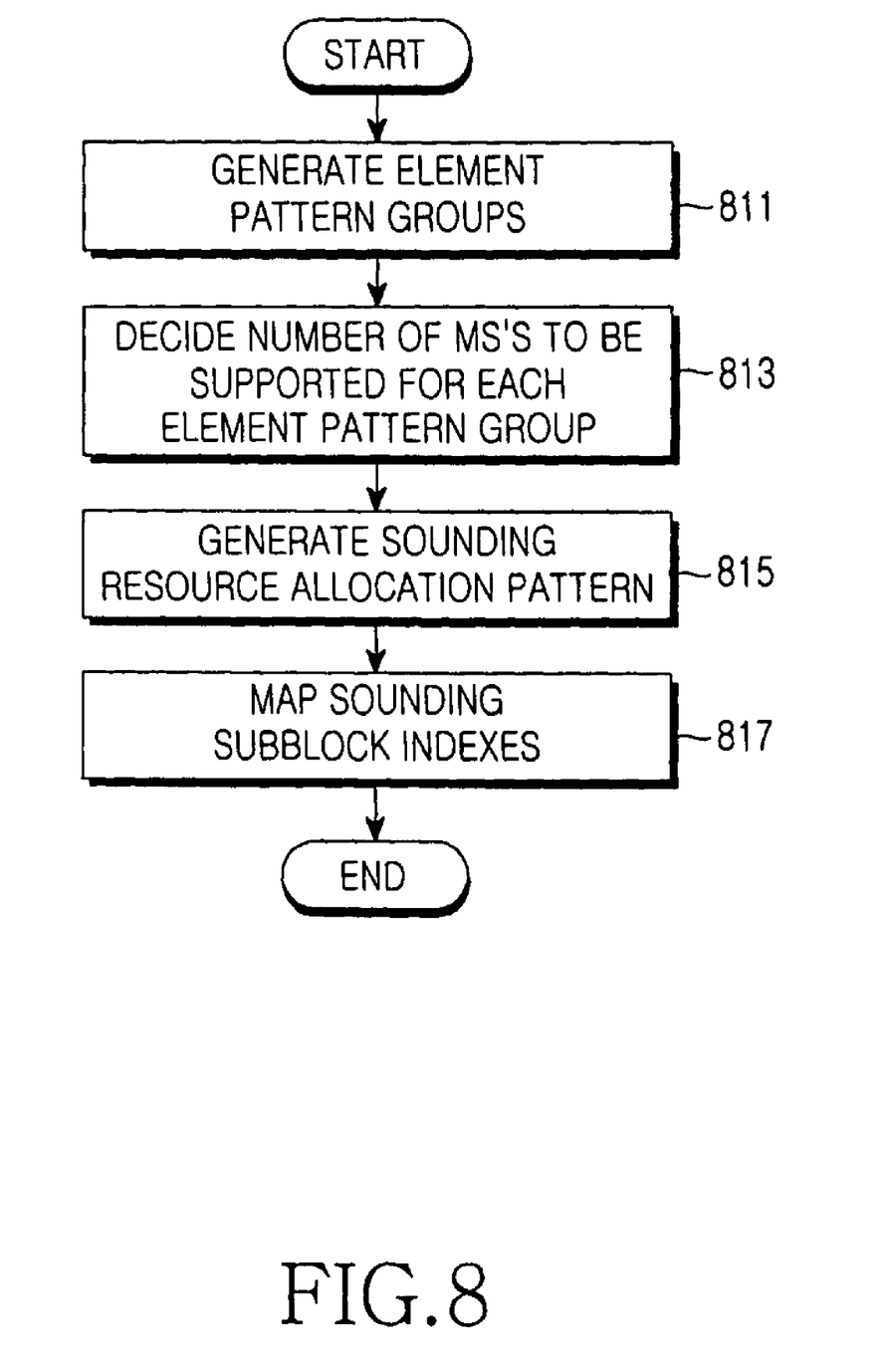
FIG. 8 is a flowchart of an operation for generating a sounding resource allocation pattern according to an exemplary embodiment of the present invention.

FIG. 8 is a flowchart of an operation for generating a sounding resource allocation pattern according to an exemplary embodiment of the present invention.

Referring to FIG. 8, to generate a plurality of sounding resource allocation patterns for different operation mode receiver ratios, element pattern groups are generated taking into account sounding resource requirements for operation modes of receivers in the manner illustrated in FIGS. 6 and 7 in step 811. In step 813, the base station determines the number of receivers $n_i$ to be supported for the operation mode corresponding to each element pattern group.

In step 815, the base station generates sounding resource allocation patterns satisfying the constraints set in step 813 by:

$$\sum_{i=1}^{N_{pattern}} \sum_{j=1}^{m_j} \rho_{ij} P_{ij} = N_p 1 \qquad \text{[Eqn. 1]}$$

-continued $$\sum_{j=1}^{m_i} \rho_{ij} \geq n_i \text{ for all } i$$

In Equation 1, 1 denotes a matrix with all elements being 1s, $m_i$ denotes the number of element pattern matrices in element pattern group i, and $N_{pattern}$ denotes the number of element pattern groups. If element pattern $P_{ij}$ is included in a sounding resource allocation pattern combination, $P_{ij}=1$ and if element pattern $P_{ij}$ is not included in the sounding resource allocation pattern block, $P_{ij}=0$. In Equation 1, $N_p$ denotes the number of receivers that can transmit a sounding signal in one time unit and one frequency unit.

In step 817, the base station maps sounding subblock indexes to each sounding resource allocation pattern combination.

As is apparent from the above description, the present invention advantageously reduces the amount of uplink resource allocation information for use in acquiring the uplink CQI of each receiver by proposing novel uplink resource allocation patterns in a communication system. The resulting decrease in overall overhead leads to the increase of system performance in the communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a transmitter for transmitting sounding resource allocation information where uplink resources will be allocated in a communication system, comprising:
    identifying operation mode information of a receiver;
    determining a sounding resource characteristic based on the identified operation mode information of the receiver, the sounding resource characteristic comprising at least one of a sounding resource size, a time interval, and a frequency range;
    selecting one of a plurality of sounding resource allocation pattern blocks in accordance with the sounding resource characteristic; and
    transmitting sounding resource allocation information including allocated sounding subblock information based on the selected sounding resource pattern block,
    wherein each sounding resource allocation pattern block comprises a two-dimensional block defined by a number of sounding frequencies and a sounding pattern period.

2. The method of claim 1, wherein transmitting sounding resource allocation information including allocated sounding subblock information based on the selected sounding resource pattern block comprises:
    reading resource layout information about each sounding subblocks of an active sounding resource allocation pattern block corresponding to the selected sounding resource allocation pattern; and
    allocating at least one of the sounding subblocks of the sounding resource allocation pattern block to the receiver according to the resource layout information.

3. The method of claim 2, wherein the sounding resource allocation information includes at least one of an Identifier (ID) of the receiver, an index of the selected sounding resource allocation pattern, and an index of the allocated sounding subblock of the sounding resource allocation pattern block.

4. The method of claim 1, wherein the operation mode information includes at least one of capability information of the receiver, channel characteristic information of the receiver, MIMO transmission scheme information of the receiver, localized/distributed transmission scheme information of the receiver, and transmit power information of the receiver.

5. The method of claim 1, wherein the sounding resource allocation pattern generation comprises:
    generating an element pattern group for each operation mode according to the operation mode information and generating at least one element pattern matrix for each element pattern group; and
    generating a sounding resource allocation pattern by combining a plurality of element pattern matrices.

6. The method of claim 5, wherein the generation of at least one element pattern matrix for each element pattern group comprises:
    forming all element matrices satisfying requirements for time and frequency periods and positions of sounding resources for the operation mode; and
    indexing each of the element matrices.

7. The method of claim 5, wherein the size of the element pattern matrix is the product between the number of sounding frequencies per frame and a sounding pattern changing period.

8. The method of claim 5, further comprising generating a plurality of sounding resource allocation patterns according to each of a set of operation mode ratios of the receiver.

9. The method of claim 8, further comprising indexing the plurality of sounding resource allocation patterns.

10. The method of claim 9, further comprising transmitting the index of the selected sounding resource allocation pattern on a broadcasting channel according to at least one of a period and whether the index of the selected sounding resource allocation pattern needs to be changed.

11. The method of claim 5, further comprising:
    dividing each of the sounding resource allocation patterns into sounding subblocks corresponding to the element pattern matrices; and
    allocating one-dimensional indexes to the sounding subblocks.

12. The method of claim 1, further comprising:
    generating a sounding resource allocation message including sounding resource allocation information; and
    transmitting to the receiver the sounding resource allocation message together with a data channel resource allocation message.

13. The method of claim 1, further comprising:
    generating a sounding resource allocation message including sounding resource allocation information; and
    piggybacking data with the sounding resource allocation message; and
    transmitting to the receiver the data piggybacked with the sounding resource allocation message.

14. The method of claim 13, wherein the sounding resource allocation message includes a 1-bit indicator indicating whether the sounding resource allocation message has been piggybacked with the data.

15. A method for receiving sounding resource allocation information in a receiver in a communication system, comprising:
    transmitting operation mode information of the receiver to a transmitter;
    receiving the sounding resource allocation information from the transmitter;

mapping one of a channel quality information value and a sounding signal to sounding resources allocated based on the sounding resource allocation information, wherein the sounding resource allocation information includes a sounding resource allocation pattern index for one of a plurality of sounding resource allocation patterns which is selected in accordance with a sounding resource characteristic determined based on the operation mode information of the receiver, wherein the sounding resource characteristic comprises at least one of a sounding resource size, a time interval, and a frequency range, and wherein each sounding resource allocation pattern comprises a two-dimensional block defined by a number of sounding frequencies and a sounding pattern period.

16. The method of claim 15, further comprising:

reading resource layout information about sounding subblocks of an active sounding resource allocation pattern corresponding to a received sounding resource allocation pattern index included in the received sounding resource allocation information when the received sounding resource allocation pattern index is different from a previous sounding resource allocation pattern index; and transmitting the one of mapped channel quality information value and sounding signal to the transmitter.

17. The method of claim 15, wherein the sounding resource allocation information includes at least one of an Identifier (ID) of the receiver, the sounding resource allocation pattern index of the selected sounding resource allocation pattern, an index of the allocated subblock, a feedback type indicating an information transmission method for the allocated sounding subblock pattern.

18. The method of claim 17, wherein the sounding resource allocation pattern index is received on a broadcasting channel and another sounding resource allocation information is included in a sounding resource allocation message received from the transmitter.

19. An apparatus for allocating sounding resources in a communication system, the apparatus comprising:

a sounding resource allocation pattern decider configured to select one of a plurality of sounding resource allocation patterns in accordance with at least a portion of operation mode information of a receiver; and a controller configured to provide the operation mode information about the receiver, allocate sounding resources to the receiver according to the selected sounding resource allocation pattern, and output sounding resource allocation information associated with the selected sounding resource allocation pattern for the receiver, wherein each sounding resource allocation pattern comprises a two-dimensional block defined by a number of sounding frequencies and a sounding pattern period.

20. The apparatus of claim 19, the system further comprising:

a sounding resource allocation pattern memory configured to store resource layout information about sounding subblocks of each sounding resource allocation pattern; and a scheduler configured to select the receiver to which the sounding resources are to be allocated by scheduling;

a broadcasting message transmitter configured to transmit an index of the selected sounding resource allocation pattern to the receiver on a broadcasting channel; and a sounding resource allocation message generator configured to generate a sounding resource allocation message using the sounding resource allocation information and transmit the sounding resource allocation message to the receiver, wherein the controller is further configured to read resource layout information about each sounding subblock of an active sounding resource allocation pattern corresponding to the selected sounding resource allocation pattern from the sounding subblock pattern memory, allocate to the receiver at least one of the sounding subblocks of the sounding resource allocation pattern according to the resource layout information, output the index of the selected sounding resource allocation pattern to the broadcasting message transmitter, and output the sounding resource allocation information about the selected receiver to the sounding resource allocation message generator.

21. The apparatus of claim 20, wherein the sounding resource allocation information includes at least one of an Identifier (ID) of the receiver, the index of the selected sounding resource allocation pattern, an index of the allocated sounding subblock, and a feedback type indicating an information transmission method for the allocated sounding subblock.

22. The apparatus of claim 20, wherein the sounding resource allocation message generator is further configured to generate the sounding resource allocation message including the sounding resource allocation information and transmit the sounding resource allocation message together with a data channel resource allocation message to the receiver.

23. The apparatus of claim 20, wherein the broadcast message transmitter is further configured to transmit the index of the selected sounding resource allocation pattern on a broadcasting channel according to at least one of a period and whether the index of the selected sounding resource allocation pattern needs to be changed.

24. The apparatus of claim 19, wherein the operation mode information includes at least one of capability information of the receiver, capability information of the receiver, channel characteristic information of the receiver, MIMO transmission scheme information of the receiver, localized/distributed transmission scheme information of the receiver, transmit power information of the receiver, and transmitter deployment environment information.

25. The apparatus of claim 24, wherein the controller is further configured to generate an element pattern group for each operation mode according to the operation mode information, generate at least one element pattern matrix for each element pattern group by forming element pattern matrices satisfying requirements for time and frequency periods and positions of sounding resources for the operation mode, and index each of the element matrices.

26. The apparatus of claim 25, wherein a size of each element pattern matrix is a product between the number of sounding frequencies per frame and a sounding pattern changing period.

27. The apparatus of claim 25, wherein the controller is further configured to generate the plurality of sounding resource allocation patterns by combining the element pattern matrices for each operation mode.

28. The apparatus of claim 27, wherein the controller is further configured to divide each of the sounding resource allocation patterns into sounding subblocks corresponding to the element pattern matrices and allocate one-dimensional indexes to the sounding subblocks.

29. The apparatus of claim 27, wherein the controller is further configured to index the plurality of sounding resource allocation patterns.

30. The apparatus of claim 20, wherein the sounding resource allocation message generator is further configured to generate the sounding resource allocation message including the sounding resource allocation information, piggyback data with the sounding resource allocation message, and transmit to the receiver the data piggybacked with the sounding resource allocation message.

31. The apparatus of claim 30, wherein the sounding resource allocation message includes a 1-bit indicator indicating whether the sounding resource allocation message has been piggybacked with the data.

* * * * *